United States Patent
Varnham

(10) Patent No.: US 7,421,175 B2
(45) Date of Patent: Sep. 2, 2008

(54) APPARATUS FOR PROVIDING OPTICAL RADIATION

(75) Inventor: Malcolm Paul Varnham, Alresford (GB)

(73) Assignee: SPI Lasers UK Limited, Southampton (GB)

( * ) Notice: Subject to any disclaimer, the term of this patent is extended or adjusted under 35 U.S.C. 154(b) by 334 days.

(21) Appl. No.: 10/561,021

(22) PCT Filed: Jun. 23, 2004

(86) PCT No.: PCT/GB2004/002712

§ 371 (c)(1),
(2), (4) Date: Dec. 16, 2005

(87) PCT Pub. No.: WO2005/002008

PCT Pub. Date: Jan. 6, 2005

(65) Prior Publication Data

US 2007/0104438 A1    May 10, 2007

(30) Foreign Application Priority Data

Jun. 25, 2003   (GB) .................. 0314817.8

(51) Int. Cl.
*G02B 6/36* (2006.01)
*G02B 6/02* (2006.01)
*G02B 6/22* (2006.01)
*H01S 3/30* (2006.01)

(52) U.S. Cl. .................. 385/126; 385/123; 385/128; 385/146; 372/6

(58) Field of Classification Search .................. None
See application file for complete search history.

(56) References Cited

U.S. PATENT DOCUMENTS

| 5,533,163 | A | 7/1996 | Muendel |
| 5,864,645 | A | 1/1999 | Zellmer et al. |
| 5,966,491 | A * | 10/1999 | DiGiovanni .................. 385/127 |
| 6,157,763 | A | 12/2000 | Grubb et al. |
| 6,345,141 | B1 * | 2/2002 | Grubb et al. .................. 385/127 |
| 6,483,973 | B1 * | 11/2002 | Mazzarese et al. .......... 385/123 |
| 6,831,934 | B2 * | 12/2004 | Wang et al. .................. 372/6 |
| 6,959,022 | B2 * | 10/2005 | Sandrock et al. ............... 372/6 |
| 2002/0172486 | A1 * | 11/2002 | Fermann ...................... 385/128 |
| 2002/0181512 | A1 | 12/2002 | Wang et al. |
| 2003/0059184 | A1 * | 3/2003 | Tankala et al. ............... 385/123 |
| 2003/0152349 | A1 * | 8/2003 | Lauzon et al. ............... 385/126 |
| 2004/0208464 | A1 * | 10/2004 | Po .............................. 385/123 |

FOREIGN PATENT DOCUMENTS

EP    1043816 A2    10/2000

* cited by examiner

*Primary Examiner*—Tina M Wong
(74) *Attorney, Agent, or Firm*—John S. Reid; Gregory IPL, P.C.

(57) ABSTRACT

Apparatus for providing optical radiation, which apparatus comprises an optical fibre (5) having a core (3), a first cladding (1) and a second cladding (2), in which the first cladding (1) has a substantially constant diameter (9) in its cross-section. The first cladding (1) can be non-circular. Advantages include more reliable cleaving, joining and splicing.

25 Claims, 5 Drawing Sheets

APPARATUS FOR PROVIDING OPTICAL RADIATION

CROSS REFERENCE TO RELATED APPLICATIONS

The present application is a U.S. National Stage filing of Patent Cooperation Treaty ("PCT") application serial number PCT/GB2004/002712, filed 23 Jun. 2004, which in turn claims priority to United Kingdom (Great Britain) Patent Application Serial Number GB0314817.8, filed in The United Kingdom on 25 Jun. 2003.

FIELD OF INVENTION

This invention relates to an apparatus for providing optical radiation. The invention can take various forms, for example a laser, an optical amplifier, a source of amplified spontaneous emission, or a master oscillator power amplifier. The invention has application for materials processing.

BACKGROUND TO THE INVENTION

Pulsed NdYAG lasers are widely used in industrial processes such as welding, cutting and marking. Care has to be taken in these processes to ensure that the plasmas generated by the laser does not interfere with the incoming laser pulses. The relatively low pulse repetition rates (6 kHz) at high peak powers that are achievable in a NdYAG laser have led to their wide application in laser machining.

Fibre lasers are increasingly being used for materials processing applications such as welding, cutting and marking. Their advantages include high efficiency, robustness and high beam quality. Examples include femtosecond lasers for multiphoton processing such as the imaging of biological tissues, Q-switched lasers for machining applications, and high-power continuous-wave lasers. Their disadvantage is their relatively low energy storage capacity as compared to NdYAG lasers.

In many applications, fibre lasers need to compete with the more mature diode pumped solid state lasers. In order to do so, much greater optical powers need to be achieved, with high reliability and lower cost.

Fibre lasers are typically longer than diode-pumped solid state lasers, and this leads to non-linear limitations such as Raman scattering becoming problematical. It would be advantageous to have fibre lasers that are shorter.

Fibre lasers are typically pumped with diode lasers in bar or stack form, or by many single-emitter diodes that are combined together. Fibre lasers can be core pumped, in which case the pump radiation is guided by the core of the active fibre, or cladding pumped, in which case the pump radiation is guided by the cladding of the active fibre. The active fibre in a cladding-pumped fibre laser needs to be longer than in a core-pumped fibre laser in order to absorb the pump radiation. This is because there is less interaction between the pump radiation and the core in a cladding pumped fibre laser than in a core-pumped fibre laser. Typically, the length of active fibre needs to be longer by the ratio of the cladding cross-sectional area and the core cross-sectional area in order to absorb the pump radiation and provide the necessary output energy. Cladding pumped fibre lasers that have been described in the prior art have inner claddings that are either rectangular, have flats machined on them, have a shape such as a polygon, or are asymmetric.

U.S. Pat. No. 4,815,079 discloses a cladding pumped fibre having a rectangular cladding and another cladding pumped fibre having a circular cladding with an offset core. These designs increase the coupling of pump radiation guided by the cladding and the fibres core. The fibres do not have the combination of a central core and a uniform cladding diameter, which make them difficult to cleave and couple radiation in connectors.

U.S. Pat. No. 5,533,163 discloses a cladding pumped fibre having an inner cladding in the form of a non-rectangular, convex polygon so that the propagating pump energy is induced to form an essentially uniform radiation field in which the various radiation modes comprising the pump energy are isotropically distributed. The fibres do not have the combination of a central core and a uniform cladding diameter, which make them difficult to cleave and couple radiation in connectors.

U.S. Pat. No. 5,864,645 discloses a circular cladding pumped fibre having at least one flat extending along its length to break circular symmetry and to set up chaotic ray behaviour. Such a fibre can be awkward to cleave, the fibre tending to twist when clamped leading to undesirable angled cleaves.

None of the above mentioned prior art shapes provides high coupling of cladding modes with the core modes whilst also combining a substantially regular geometry with curved outside edges that is suitable for cleaving, incorporating into optical fibre connectors, and coupling radiation from substantially round sources.

An aim of the present invention is to provide an apparatus for providing optical radiation that reduces the above aforementioned problem.

SUMMARY OF THE INVENTION

According to a non-limiting embodiment of the present invention, there is provided apparatus for providing optical radiation, which apparatus comprises an optical fibre having core, a first cladding and a second cladding, in which the first cladding has a substantially constant diameter in its cross-section.

A first cladding having a substantially constant diameter makes the fibre more suitable for cleaving. Fibre cleavers clamp fibres with mechanical devices. Fibres not having a constant diameter can twist during this process. Thus a fibre with a substantially constant diameter is advantageous and provides distinct advantages over the prior art.

The first cladding may be non-circular.

The first cladding may have at least one axis of mirror symmetry.

The first cladding may have a geometric centre. The core may be located at the geometric centre. Having a fibre with a core in its geometric centre facilitates coupling of optical radiation in connectors and splices. The core may be offset from the geometric centre which may be advantageous in certain circumstances—for example in coupling to another fibre having an offset core, or for increasing mode coupling in certain fibre geometries.

The core may be centred at the centre of the smallest imaginary circle that can contain the first cladding. Alternatively, the core may be offset from the centre of the largest imaginary circle that can be contained within the first cladding.

The first cladding may comprise circular arcs having centres at the vertices of an equilateral star. The circular arcs may have a first radius equal to the length of the side of the star. The circular arcs may each have a first radius greater than the length of the side of the star, which circular arcs are joined by circular arcs each having a centre located at the vertices, and a second radius equal to the difference between the first radius and the length of the side of the star.

Each line of the star preferably crosses all the other lines of the star. The star may be an equiangular star. Alternatively, the star may contain at least two different angles.

The star preferably contains an odd number of vertices.

The fibre may contain at least one longitudinally extended hole. The hole may be circular. Alternatively, the hole may be non-circular.

The fibre may contain at least one region of low refractive index. The region of low refractive index may be circular. Alternatively, or in addition, the region of low refractive index may be non-circular.

The fibre may comprise rare-earth dopant. The rare earth doping may be selected from the group comprising Ytterbium, Erbium, Neodymium, Praseodymium, Thulium, Samarium, Holmium and Dysprosium, Erbium codoped with Ytterbium, or Neodymium codoped with Ytterbium.

The apparatus may comprise a pump source for providing pump radiation coupled to the first cladding.

The apparatus may be in the form of a laser, an amplifier, a source of amplified spontaneous emission, or a master oscillator power amplifier.

It is preferred in the embodiments described above that the refractive index of the core is greater than the refractive index of the first cladding. It is also preferred that the first cladding has a higher refractive index than the second cladding. The first cladding may be a glass such as a silica, doped silica, or a phosphate glass. The second cladding may be a polymer, silica, a doped silica, a fluorosilicate, or a doped phosphate glass. If the second cladding is a glass, then it is preferred that the second cladding is coated with a polymer.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
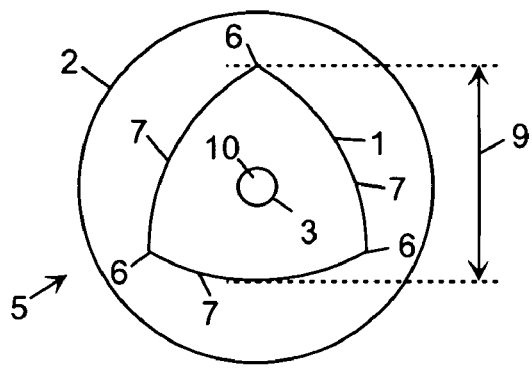
FIG. 1 shows an apparatus for providing optical radiation according to the present invention.

With reference to FIG. 1, there is provided apparatus for providing optical radiation, which apparatus comprises an optical fibre 5 having a core 3, a first cladding 1 and a second cladding 2, in which the first cladding 1 has a substantially constant diameter 9 in its cross-section.

By diameter 9 it is meant the diameter or width of the first cladding 1.

It is preferred that the refractive index of the core is greater than the refractive index of the first cladding 1 which has a higher refractive index than the second cladding 2. The first cladding 1 may be a glass such as a silica, doped silica, or a phosphate glass. The second cladding 2 may be a polymer, silica, a doped silica, a fluorosilicate, or a doped phosphate glass. If the second cladding 2 is a glass, then it is preferred that the second cladding 2 is coated with a polymer.

The shape of the first cladding 1 shown in FIG. 1 is known as a Realeaux triangle. It is non-circular, and has the property that it has constant diameter. It has three vortices 6, each of which acts as the centre for the opposite circular arc 7 which connects adjacent vortices 6.

Figure 2:
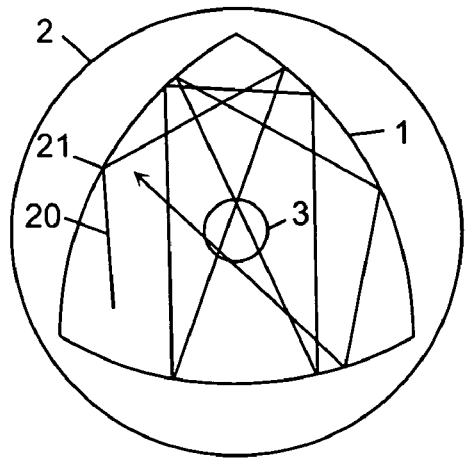
FIG. 2 shows rays being internally reflected by a first and a second cladding.

An advantage of utilizing such a first cladding 1 is illustrated in FIG. 2 which shows a light ray 20 (assumed propagating longitudinally along the fibre 5) being totally internally reflected at the interface 21 between the first cladding 1 and the second cladding 2. In a circular fibre, the ray 20 would be a so-called whispering gallery mode, reflecting at a uniform angle, and never intersecting the core 3. However, utilizing the Realeaux triangle, the ray 20 reflects at higher angles such that it intercepts the core 20 several times in the example shown. The result is a higher degree of overlap of rays propagating along the first cladding 1 with the core 3, which is advantageous for a cladding pumped fibre laser or amplifier because this equates to a shorter length over which pump energy is absorbed by the core 3.

Further examples of the first cladding 1 are first claddings 31, 41, 51, 61, 71, 81, 91, and 101 shown in FIGS. 3 to 10. The first claddings 31, 41, 51, and 61 have both rotational and mirror symmetry. The first claddings 71 and 81 have only one axis 77 of mirror symmetry. The first claddings 91 and 101 shown in FIGS. 9 and 10 have no axis of mirror symmetry.

Figure 3:
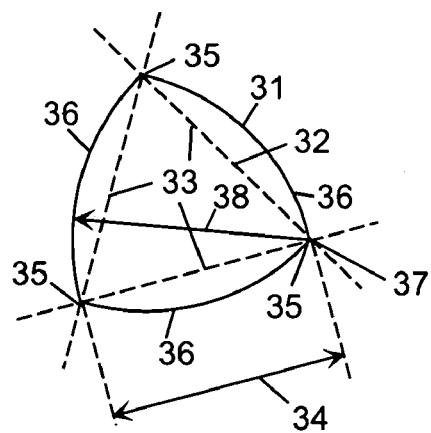
FIGS. 3 and 4 show first claddings based on a star with three vertices.

Referring to FIG. 3, the first cladding 31 is defined by an equilateral star 32 comprising three lines 33, three vertices 35, and defined by a first length 34 equal to the length of the side of the star 32. The first cladding 31 comprises circular arcs 36 connecting adjacent vertices 35, the circular arcs 36 having centres 37 at the vertices 35 of the equilateral star 32. The circular arcs 35 have a first radius 38 equal to the first length 34.

Figure 4:
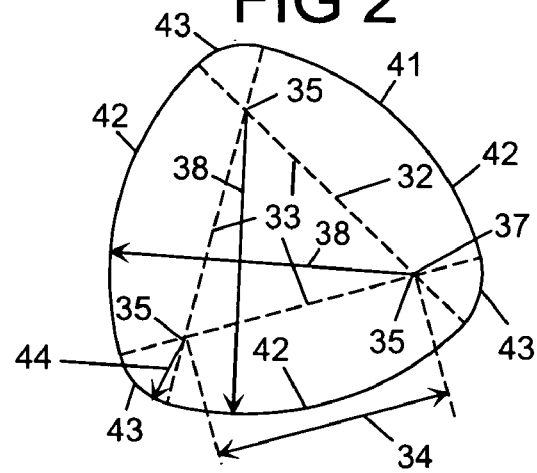

FIG. 4 shows a first cladding 41 defined by circular arcs 42 and 43. The circular arcs 42 are centred on the vertices 35, have a first radius 38 that is greater than the first length 34, and connect adjacent lines 33. The circular arcs 42 are joined together with circular arcs 43 each centred at the vertices 35 and each having a second radius 44 equal to the difference between the first radius 38 and the first length 34.

Figure 5:
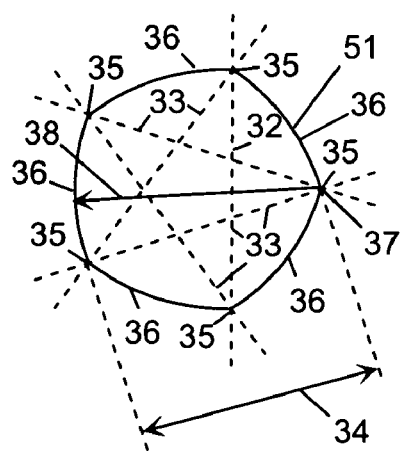
FIGS. 5 and 6 show first claddings based on an equiangular star with five vertices.
Figure 6:
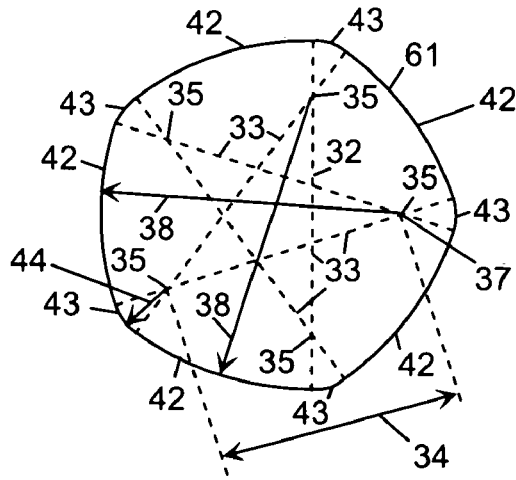

FIGS. 5 and 6 show first claddings 51 and 61 similar to the first claddings 31 and 41 respectively, but with five vertices 35 instead of three vertices 35. The equilateral stars 32 shown in FIGS. 3, 4, 5 and 6 are equiangular stars.

Figure 7:
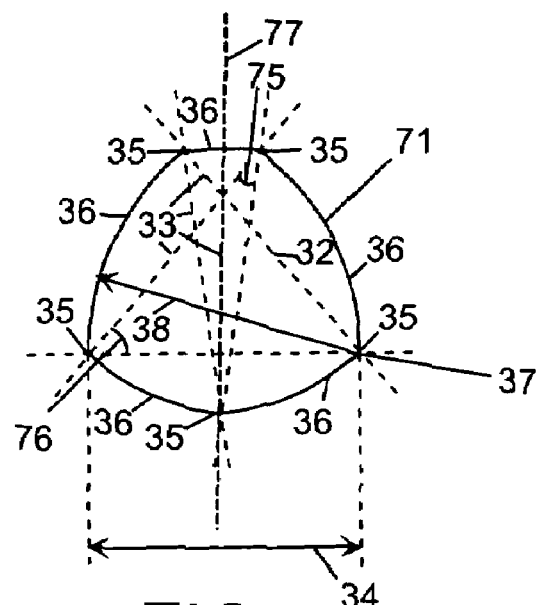
FIGS. 7 and 8 show first claddings based on a star with five vertices which first cladding has an axis of mirror symmetry.
Figure 8:
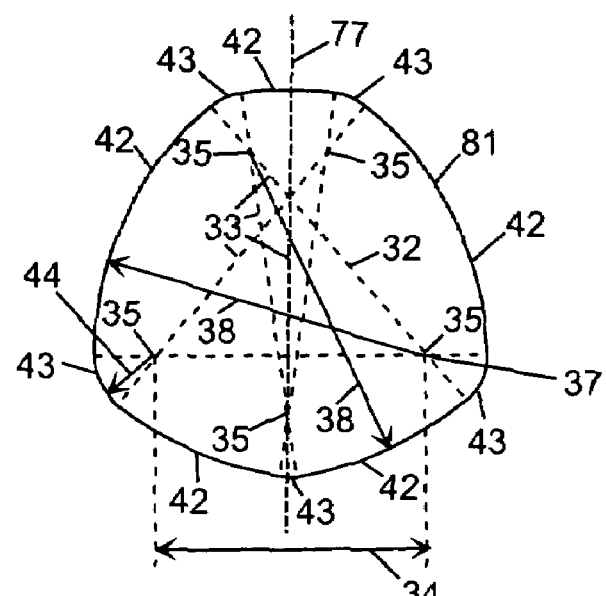

FIGS. 7 and 8 show first claddings 71 and 81 similar to first claddings 51 and 52 respectively, but where the equilateral stars 32 contain at least two different angles 75, 76, that is, the equilateral stars 32 are not equiangular stars. The first claddings 71 and 81 contain an axis of mirror symmetry 77.

Figure 9:
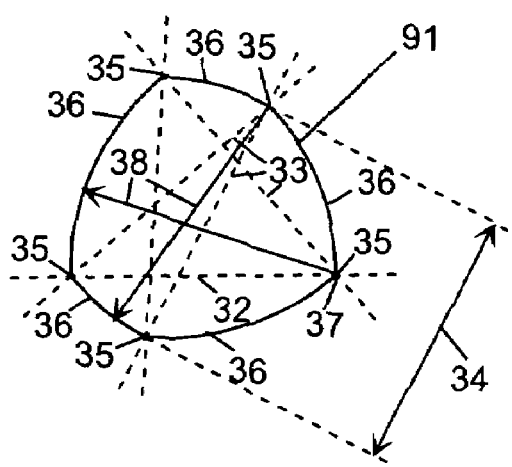
FIGS. 9 and 10 show first claddings with no axis of mirror symmetry.
Figure 10:
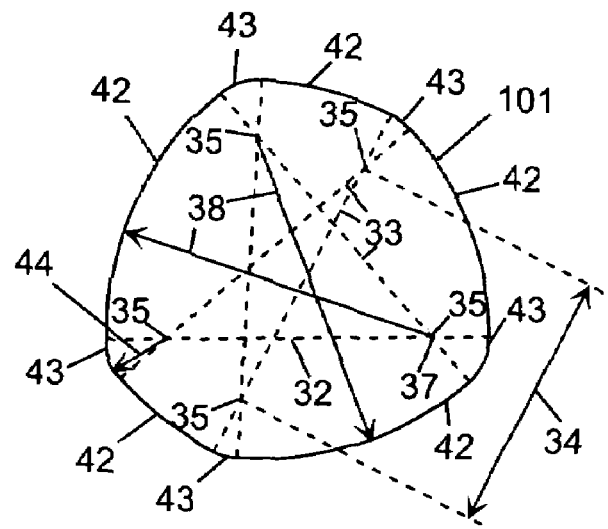

FIGS. 9 and 10 show first claddings 91 and 101 defined by equilateral stars 32 characterised in having no axes of mirror symmetry.

The stars 32 shown in FIGS. 3 to 10 all have an odd number of vertices 35. In general the number of vertices 35 should be odd, and can be between three and one hundred and three, but is preferably between three and nine. Each of the lines 33 that make up the stars 32 in FIGS. 3 to 10 cross each of the other lines 33.

Figure 11:
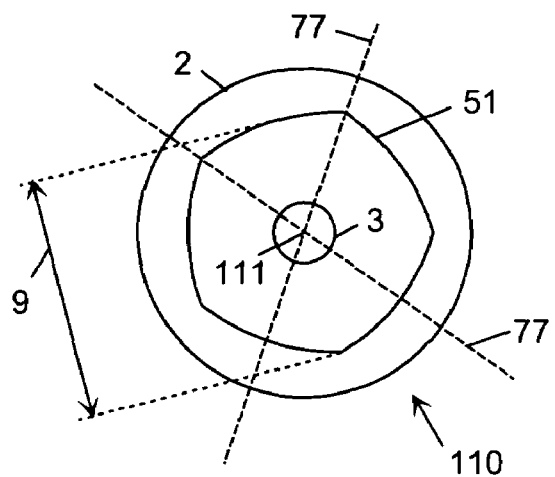
FIG. 11 shows a fibre containing a core at the geometric centre of the first cladding.
Figure 12:
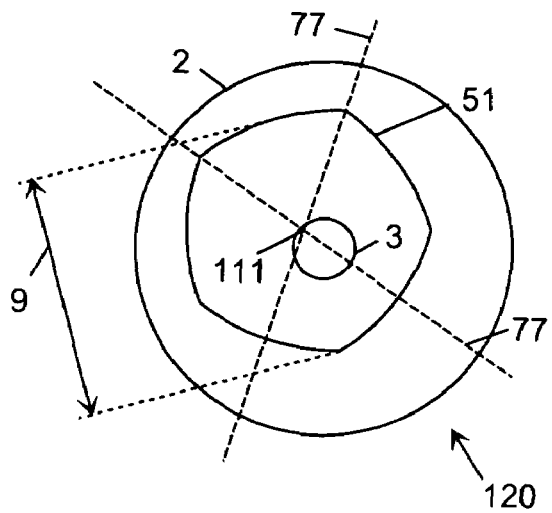
FIG. 12 shows a fibre containing a core offset from the geometric centre of the first cladding.

FIG. 11 shows a fibre 110 containing the first cladding 51. The core 3 is located at the geometric centre 111 of the first cladding 51 that is defined by the intersect of two of the lines of mirror symmetry 77. As shown by the fibre 120 of FIG. 12, the core 3 can also be offset from the geometric centre 111. The cores 3 in both FIGS. 11 and 12 are shown as being concentric with the second cladding 2 which can sometimes be convenient for locating the core 3 and/or for splicing the fibre 110, 120, especially if the second cladding 2 is made from a hard material such as a glass.

Figure 13:
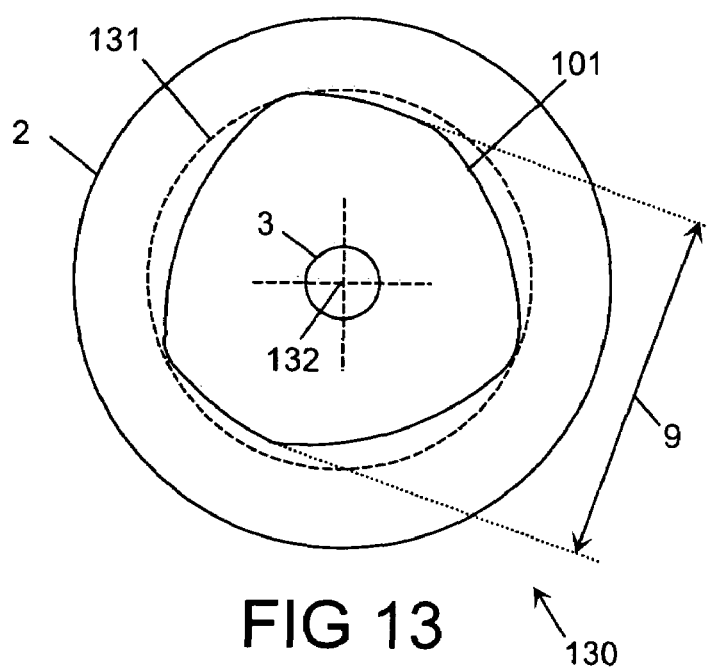
FIG. 13 shows a fibre containing a core that is centred on the centre of the smallest imaginary circle that contains the first cladding.
Figure 14:
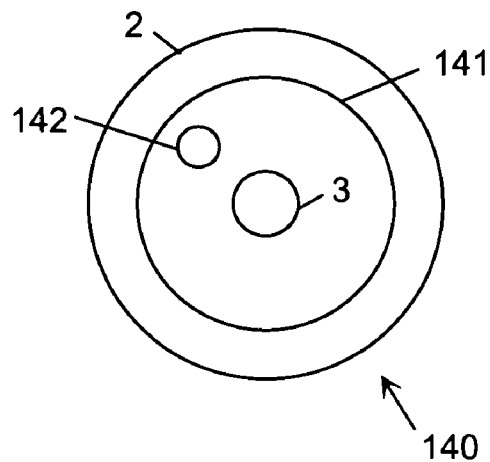
FIG. 14 shows a fibre having a circular first cladding and a longitudinally extending hole.

The first claddings 91 and 101 shown with reference to FIGS. 9 and 10 do not have lines of mirror symmetry 77 and do not have geometric centres. FIG. 13 shows a fibre 130 comprising the first cladding 101. A circle 131 is defined which is the smallest circle that can contain the first cladding 101. The core 3 may be centred at the centre 132 of the circle 131. This location is advantageous for splicing the fibre 130. Alternatively, the core 3 may be offset from the centre of the circle 131 which in certain configurations may be advantageous for maximising the overlap between cladding modes and the core. FIG. 14 shows a fibre 140 comprising a circular first cladding 141 which contains a longitudinally extended hole 142. The hole 142 may be circular or non-circular. The hole 142 may be elliptical or substantially rectangular. The hole 142 will assist in coupling cladding modes with the core 3.

Figure 15:
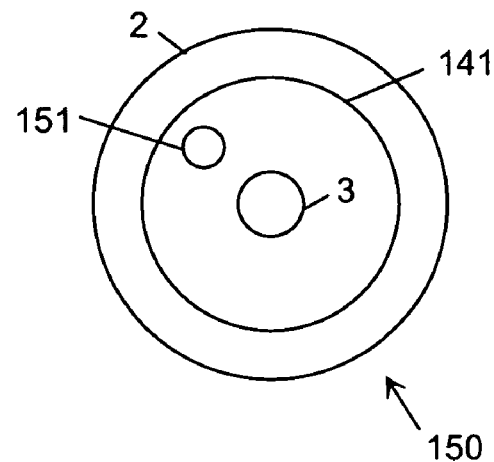
FIG. 15 shows a fibre having a circular first cladding and a region of low refractive index.

FIG. 15 shows a fibre 150 containing a region 151 of low refractive index in the first cladding 141. By low refractive index, it is meant that the refractive index of the region 151 is less than that of the first cladding 141. The region 151 of low refractive index may be circular. Alternatively, or in addition, the region 151 of low refractive index may be non-circular. The region 151 of low refractive index may be boron doped silica, and may be a stress rod manufactured using modified vapour chemical deposition.

Figure 16:
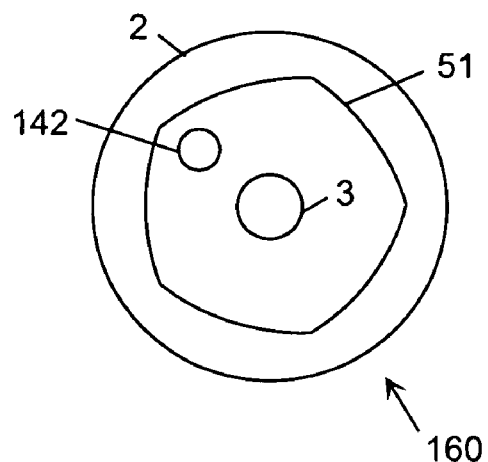
FIG. 16 shows a fibre having a non-circular first cladding and a longitudinally extending hole.
Figure 17:
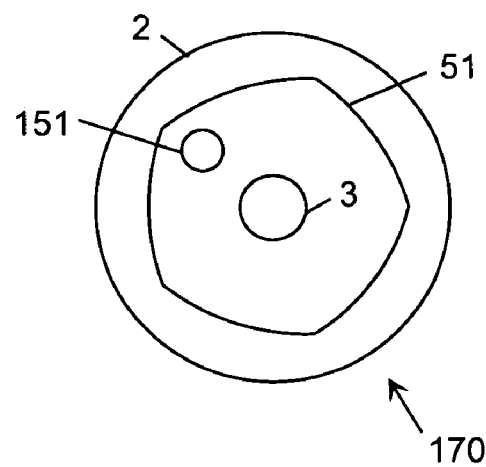
FIG. 17 shows a fibre having a non-circular first cladding and a region of low refractive index.

FIGS. 16 and 17 show similar fibres 160, 170 to those shown in FIGS. 14 and 15 but with the non-circular first cladding 51.

With reference to FIG. 1, the fibre 5 preferably comprises rare-earth dopant 10. The rare earth dopant 10 may be selected from the group comprising Ytterbium, Erbium, Neodymium, Praseodymium, Thulium, Samarium, Holmium and Dysprosium, Erbium codoped with Ytterbium, or Neodymium codoped with Ytterbium. The rare earth dopant 10 may be located in the core 3, in the first cladding 1, or in both the core 3 and the first cladding 1. Fibres 110, 120, 130, 140, 150, 160 and 170 preferably contain rare-earth dopant 10.

Fibres containing a first cladding 1 as described with reference to the above figures can be fabricated by inserting a modified chemical vapour deposition perform into a pre-machined glass capillary having the desired outer contour and materials properties. The machining can be performed using ultrasonic milling and/or lapping.

Figure 18:
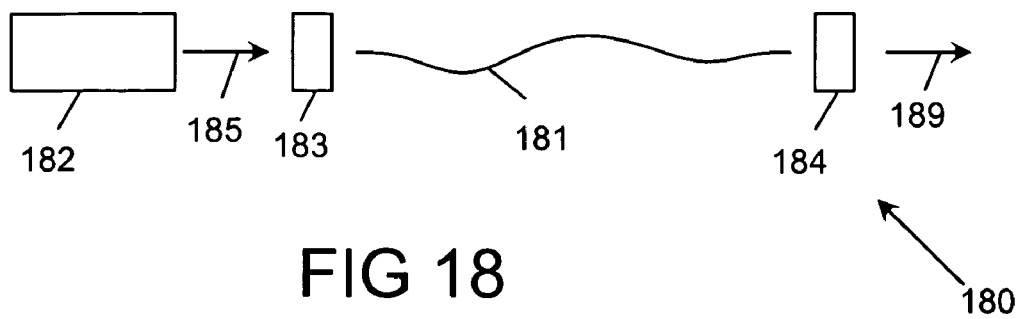
FIG. 18 shows apparatus in the form of a laser.

FIG. 18 shows apparatus for providing optical radiation 189 in the form of a laser 180 comprising a fibre 181 and a pump source 182 for providing pump radiation 185 to the first cladding 1, and first and second reflectors 183, 184. The fibre 181 is preferably one of the fibres described with reference to FIGS. 1 to 17 that contains rare earth dopant 10. The pump source 182 can comprise at least one semiconductor laser diode, a laser diode bar or a laser diode stack. The reflectors 183 and 184 can comprise a fibre Bragg grating, a grating, a dichroic mirror, or an end reflection from the fibre 181. It is preferable that the reflection of the first reflector 183 is greater than the reflection of the second reflector. The first reflector 183 is preferably dichroic, reflecting light at the wavelength of the optical radiation 189, and transmitting the pump radiation 185. The fibre 181 can be multimode or monomode optical fibre.

Figure 19:
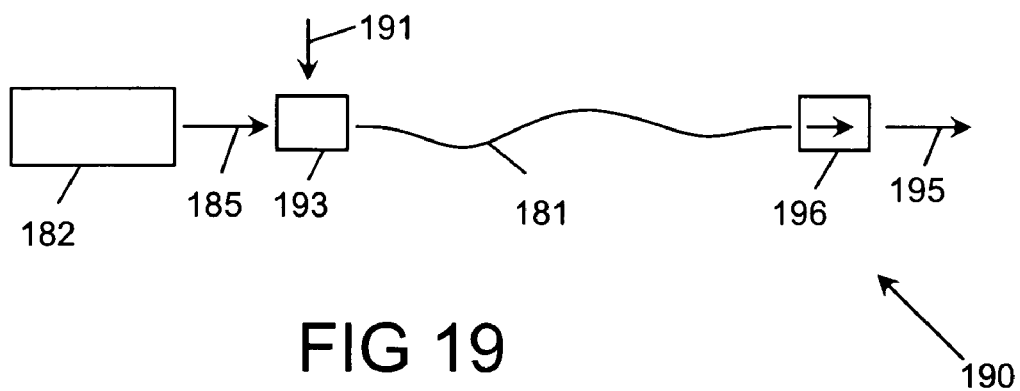
FIG. 19 shows apparatus in the form of an optical amplifier.

FIG. 19 shows apparatus for providing optical radiation 195 in the form of an optical amplifier 190. The amplifier 190 is similar to that shown in FIG. 18 except that there are no reflectors 183, 184. Pump radiation 185 and signal 191 are coupled into the fibre 181 by a coupler 193. The coupler 193 may be any form of optical combining means such as a beam splitter or coupler, but is preferably a dichroic mirror or wavelength division multiplexing coupler. The optical amplifier 190 can include one or more isolators 196.

Figure 20:
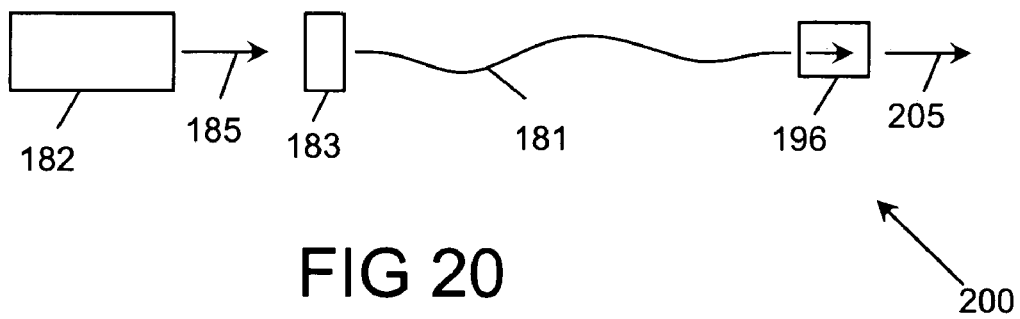
FIG. 20 shows apparatus in the form of a source of amplified spontaneous emission.

FIG. 20 shows apparatus for providing optical radiation 205 in the form of a source of amplified spontaneous emission 200 that comprises the pump source 182 and the fibre 181. The source 200 may also contain one or both of the isolator 196 and reflector 183.

Figure 21:
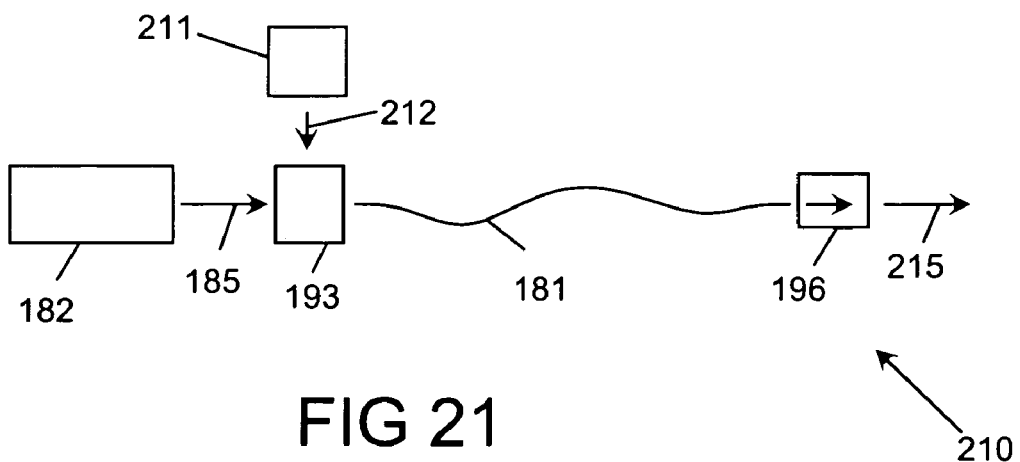
FIG. 21 shows apparatus in the form of a master oscillator power amplifier.

FIG. 21 shows apparatus for providing optical radiation 215 in the form of a master oscillator power amplifier 210 comprising the pump source 182, the fibre 181, and a seed source 211 for providing an optical seed 212. The seed source 211 may be a semiconductor laser, a pulsed laser, a fibre laser, or a solid state laser. A semiconductor laser is often desirable in this application because the amplitude of the optical seed 212, and hence the optical radiation 215 can be controlled to a desired shape by modulating the drive current into the semiconductor laser. The provision of the isolator 196 is optional.

The laser 180, the amplifier 190, the source of amplified spontaneous emission 200, and the master oscillator power amplifier 210 are believed to have important application as sources of high power laser radiation for industrial and aerospace applications including materials processing. In such applications it is often desirable to synchronise the pump source 182 with the movement of an optical scanner.

It is to be appreciated that the embodiments of the invention described above with reference to the accompanying drawings have been given by way of example only and that modifications and additional components may be provided to enhance performance.

The present invention extends to the above-mentioned features taken in isolation or in any combination.

The invention claimed is:

1. Apparatus for providing optical radiation, comprising an optical fibre having a core, a first cladding and a second cladding, and wherein:
   the core is located within the first cladding;
   the first cladding is located within the second cladding;
   in cross section, the first cladding is non-circular;
   in cross section, the first cladding is defined by an equilateral star and an outer periphery which is polygonal in shape, the polygonal shape being defined by a plurality of intersecting sides, each side comprising a circular arc, all said circular arcs being concave with respect to the core to thereby form a plurality of concave sides; and the circular arcs have centers at vertices of the equilateral star, such that the first cladding has a substantially constant diameter in its cross-section.

2. Apparatus according to claim 1 wherein the first cladding has at least one axis of mirror symmetry.

3. Apparatus according to claim 1 wherein the first cladding has a geometric centre.

4. Apparatus according to claim 3 in which the core is located at the geometric centre.

5. Apparatus according to claim 3 in which the core is offset from the geometric centre.

6. Apparatus according to claim 1 wherein the core is centred at the centre of a smallest imaginary circle that can contain the first cladding.

7. Apparatus according to claim 1 wherein the core is offset from the centre of a largest imaginary circle that can be contained within the first cladding.

8. Apparatus according to claim 1 wherein the circular arcs each have a first radius equal to a length of a side of the equilateral star.

9. Apparatus according to claim 1 wherein the circular arcs each have a first radius greater than a length of a side of the equilateral star, the circular arcs are joined by second circular arcs having a centre located at the vertices, and the second circular arcs each have a second radius equal to the difference between the first radius and the length of the side of the star.

10. Apparatus according to claim 1 wherein the equilateral star is defined by lines, and each line of the star crosses all the other lines of the star.

11. Apparatus according to claim 10 wherein the equilateral star is an equiangular star.

12. Apparatus according to claim 10 wherein the equilateral star contains at least two different angles.

13. Apparatus according to claim 1, wherein the equilateral star contains an odd number of vertices.

14. Apparatus according to claim 1 wherein the fibre contains at least one longitudinally extended hole.

15. Apparatus according to claim 14 wherein the hole is circular.

16. Apparatus according to claim 14 wherein the hole is non-circular.

17. Apparatus according to claim 1 wherein the fibre contains at least one region of low refractive index.

18. Apparatus according to claim 17 wherein the region of low refractive index is circular.

19. Apparatus according to claim 17 wherein the region of low refractive index is non-circular.

20. Apparatus according to claim 1 wherein the fibre comprises rare-earth dopant.

21. Apparatus according to claim 20 wherein the rare earth doping is selected from the group consisting of Ytterbium, Erbium, Neodymium, Praseodymium, Thulium, Samarium, Holmium and Dysprosium, Erbium codoped with Ytterbium, and Neodymium codoped with Ytterbium.

22. Apparatus according to claim 1 and further comprising a pump source configured to provide pump radiation coupled to the first cladding.

23. Apparatus according to claim 1 wherein the apparatus is in the form of a laser, an amplifier, a source of amplified spontaneous emission, or a master oscillator power amplifier.

24. Apparatus according to claim 1 wherein the star comprises between three and nine inclusive vertices.

25. Apparatus for providing optical radiation, comprising an optical fibre having core, a first cladding and a second cladding, and wherein:

the core is located within the first cladding;

the first cladding is located within the second cladding;

in cross section, the first cladding is substantially non-circular;

in cross section, the first cladding is defined by an outer periphery being defined by a plurality of intersecting sides, each side being concave with respect to the core to thereby form a plurality of concave sides;

the first cladding has a substantially constant diameter in its cross-section; and at least one of the concave sides has a curvature of radius greater than half the diameter.

\* \* \* \* \*